United States Patent [19]

Uchida et al.

[11] Patent Number: 4,605,356

[45] Date of Patent: Aug. 12, 1986

[54] APPARATUS FOR CONTINUOUSLY PRESSURE-FEEDING SLURRY

[75] Inventors: Kenji Uchida, Kashiwa; Masakatsu Sakamoto, Matsudo; Makoto Saito, Ibaraki; Yukishige Kamino, Tsuchiura, all of Japan

[73] Assignee: Hitachi, Ltd., Tokyo, Japan

[21] Appl. No.: 578,789

[22] Filed: Feb. 10, 1984

[30] Foreign Application Priority Data

Mar. 16, 1983 [JP] Japan ............................... 58-42148

[51] Int. Cl.⁴ ........................................... F04F 11/00
[52] U.S. Cl. .................................. 417/102; 417/85; 417/900
[58] Field of Search ............... 417/102, 43, 85, 101, 417/92, 900; 60/351

[56] References Cited

U.S. PATENT DOCUMENTS

| | | |
|---|---|---|
| 3,155,040 | 11/1964 | Shurts et al. .......................... 192/85 R |
| 3,156,095 | 11/1964 | Tauson ...................................... 60/351 |
| 4,037,992 | 7/1977 | Uchida et al. .......................... 417/102 |

*Primary Examiner*—Edward K. Look
*Attorney, Agent, or Firm*—Antonelli, Terry & Wands

[57] ABSTRACT

Slurry consisting of water and solid material is fed to a plurality of supply chambers arranged in parallel to each other by a low pressure slurry pump, and the filled slurry is transferred to a transferring pipe under liquid pressure of a high pressure driving liquid pump. Also, to the upper and lower portions of the supply chambers are connected driving liquid supply/discharge pipes and slurry supply/discharge pipes having valves. The valves are selectively opened/closed in accordance with a detection of a float position within each supply chamber to thereby feed the slurry continuously under pressure. Upon the slurry pressure feeding, the valves connected to the supply chamber lower portion are prevented from closing due to a packing condition.

1 Claim, 7 Drawing Figures

APPARATUS FOR CONTINUOUSLY PRESSURE-FEEDING SLURRY

BACKGROUND OF THE INVENTION

The present invention relates to an apparatus for continuously pressure-feeding slurry such as bauxite or nickel ore slurry, and more particularly, a slurry pressure feeding apparatus for preventing an undesirable closing of a change-over valve interposed in a slurry supply or discharge pipe connected to a lower portion of a supply chamber when the slurry is fed under pressure.

For example, in U.S. Pat. No. 3,556,682, there has been proposed a slurry pressure feeding apparatus comprising a plurality of supply chambers which are arranged in parallel to each other, a low pressure slurry pump for filling each of the supply chambers with slurry consisting of water and solid material, and a high pressure driving liquid pump for discharging the slurry from the supply chambers to a transferring pipe, wherein a position of a float floating on an interface between the slurry and driving liquid within each of the supply chambers is detected by an outside sensor and in accordance with the detecting signal thereof, change-over valves interposed in the supply or discharge pipe for the driving liquid and in the supply or discharge pipe for the slurry are opened/closed selectively, so that the slurry is continuously transferred under the liquid pressure.

The above described change-over valve interposed in the slurry supply or discharge pipe is of such type that the fluid passage is rendered to be communicated or interrupted by slidingly moving a valve body up and down along its valve seat under the liquid pressure of the slurry, that is, a so-called lift type check valve.

On the other hand, the above-described high pressure driving liquid pump is of the centrifugal type. Typical characteristic curves of the driving liquid pump are shown in FIG. 1, in which reference character Q indicates the output flow rate, P the pump outlet pressure, $P_1$ the pump outlet pressure at a normal flow rate, $P_2$ the pump outlet pressure in a pump closing condition (flow rate of zero), $\Delta P_2$ the differential pressure between the closing pump outlet pressure $P_2$ and the normal flow rate pump outlet pressure $P_1$, Hf the pressure loss of the overall passage from the pump, and Kw the necessary power for the pump.

In the case where the differential pressure $\Delta P_2$ of the driving liquid pump having the characteristic curves shown is less than a necessary pressure due to the fact that the contact area between the valve body and seat of the check valve as a whole is kept under a packing condition, an upward movement of the valve body is prevented so that the check valve is not opened. As a result, the flow of the slurry is discontinued to cause a variation in pressure, or otherwise the driving of the slurry continuous pressure feeding apparatus is impossible.

In other words, in the above described lift type check valve, when particles of slurry to be treated have a fine diameter, the overall contact area between the valve body and seat becomes an intimate surface contact to be kept under the packing condition.

The pump characteristics obtained by a rotational speed control through a fluid coupling and the like to save energy are shown in FIG. 2. Namely, if the flow rate is decreased to about 30%, the flow rate-pressure characteristic is represented by P'. As is apparent from the curve P', in the case where the flow rate is decreased to 30% through the rotational speed control, although a pump in which the differential pressure $\Delta P_2$ at the flow rate of 100% is greater than packing pressure $\Delta P_1$ (mention later) is selected, the differential pressure $\Delta P_2$ becomes $\Delta P_2'$. Since the differential pressure $\Delta P_2'$ is equal to only several tenths of the differential pressure $\Delta P_2$, under this condition, the check valve cannot be opened in the packing state in the same way as in the foregoing example.

SUMMARY OF THE INVENTION

An object of the present invention is to provide a slurry continuous pressure feeding apparatus capable of ensuring an opening operation of a change-over valve connected to a lower portion of a supply chamber upon slurry pressure-feeding and stably pressure-feeding the slurry continously.

Another object of the invention is to provide a slurry continuous pressure feeding apparatus of energy-saving type through a rotational speed control system.

These and other objects of the invention are attained by providing a slurry continuous pressure feeding apparatus in which driving liquid supply/discharge pipes and slurry supply/discharge pipes each having valves are connected to upper and lower portions of each of a plurality of supply chambers arranged in parallel; a position of a float floating on an interface between the slurry and the driving liquid within each supply chamber is detected by a sensor; and in accordance with the detecting signal thereof, the valves on the upper side are selectively opened/closed so that the slurry is fed under pressure through the valves on the lower sides of the supply chambers, the apparatus being characterized by comprising means for preventing an undesirable closing of the valves on the lower side of the supply chamber upon the pressure-feeding of slurry.

DETAILED DESCRIPTION OF THE PREFERRED EMBODIMENTS

Figure 1:
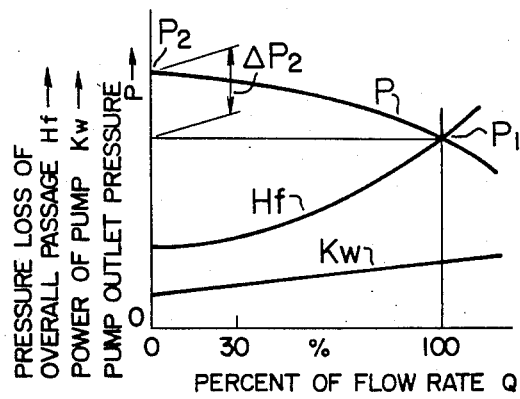
FIGS. 1 and 2 are illustrative of typical characteristics of a driving liquid pump, FIG. 1 showing characteristic curves at a constant rotational speed and FIG. 2 showing characteristic curves obtained through a rotational speed control.
Figure 2:
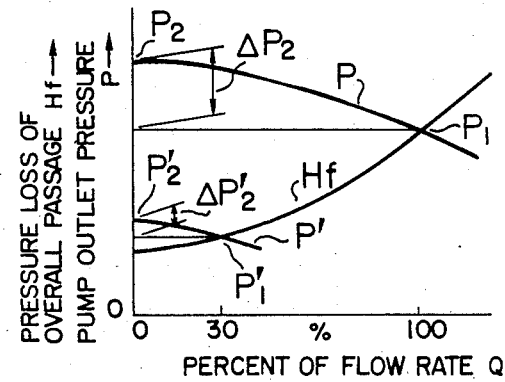
Figure 3:
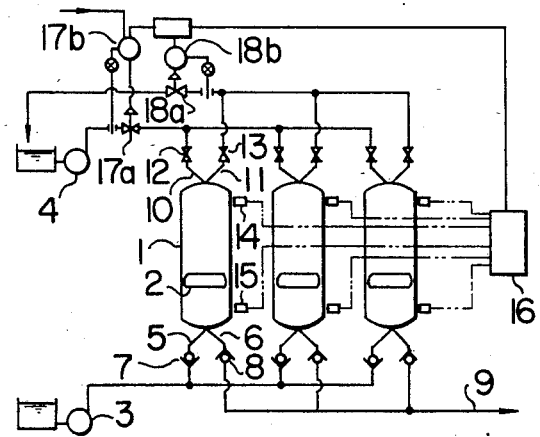
FIG. 3 is a systematic view showing one example of a slurry continuous pressure feeding apparatus in accordance with the present invention.

The present invention will now be described in detail with reference to the accompanying drawings. Shown in FIG. 3 is a slurry continuous feeding apparatus according to the invention which comprises a plurality of supply chambers 1 arranged in parallel to each other and accomodating therein floats 2, a low pressure slurry pump 3 for supplying slurry to each of the supply chambers 1, a high pressure driving liquid pump 4 for supplying driving liquid to each of the supply chambers 1, change-over valves such as lift type check valves 7, 8 interposed in slurry supply and discharge pipes 5, 6, change-over valves 12, 13 interposed in driving liquid supply and discharge pipes 10, 11, sensors 14, 15 for detecting upper and lower limit positions of each float 2, a timer unit 16 for actuating the sensors 14, 15, and regulating units 17a, 17b and 18a, 18b for adjusting supply and discharge amounts of the driving liquid, respectively.

With the thus constructed apparatus, under the condition that the high pressure driving liquid pump 4 and the low pressure slurry pump 3 are operated, if the change-over valve 13 is opened to discharge the driving liquid contained in the supply chamber 1, then the slurry is supplied to the supply chamber 1 through the supply pipe 5 and the check valve 7 by the delivery pressure of the slurry pump 3. In accordance with this operation, if the float 2 is raised to reach a position of the sensor 14, then the change-over valve 13 mounted in the driving liquid discharge pipe 11 is closed.

Subsequently, when the change-over valve 12 mounted on the driving liquid supply pipe 10 is opened, the driving liquid is fed into the supply chamber 1 by the driving liquid pump 4. As a result, the slurry filled in the supply chamber 1 is forced through the slurry discharge pipe 6 and the check valve 8 into the slurry transferring pipe 9. In accordance with this operation, if the float 2 is lowered to reach a position of the sensor 15, then the change-over valve 12 is closed and the change-over valve 13 is opened in the same manner.

By repeating the above described operation in order with respect to the single supply chamber, the slurry is intermittently fed to the slurry transferring pipe 9. Therefore, by operating a plurality of supply chambers in a predetermined order, the slurry may be continuously fed thereto.

Figure 4:
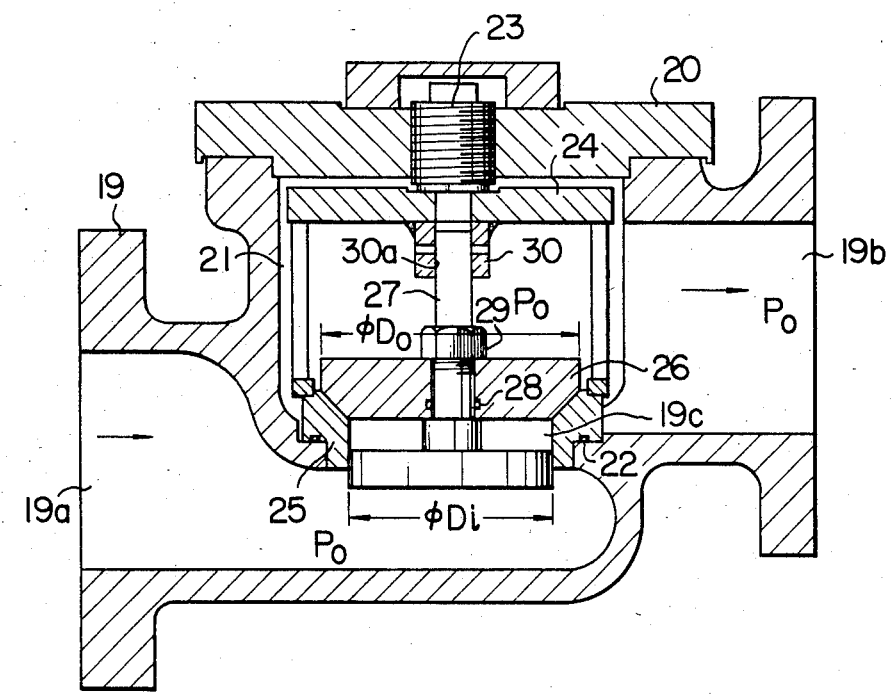
FIG. 4 is a cross-sectional view of a lift type check valve used in the embodiment shown in FIG. 3.

FIG. 4 shows a structure of the above-described lift type check valve 7 or 8, in which a valve chamber 21 is formed by mounting a cover 20 on a top portion of a casing 19 having an inlet opening 19a, an outlet opening 19b and a communicating opening 19c for communicating the inlet and outlet openings to each other. A valve seat 25 is mounted on the communicating opening 19c through a seat retainer 24 by a retaining bolt 23 coupled to an O-ring 22 and a cover 20. At the same time, an end of a spindle 27 mounted through an O-ring 28 and a nut 29 onto a valve body 26 confronted with the valve seat 25 is slidably inserted into an opening 30a of a guide 30 which is mounted on the seat retainer 24 so that the valve seat is movable in an up-and-down direction.

In the thus constructed check valve, when the pressure $P_0$ of the slurry introduced from the inlet opening 19a is higher than the pressure $P_0$ on the outlet opening 19b side, the valve body 26 is raised to form a flow passage at the valve seat 25, so that the slurry flowing through this passage is discharged from the inlet opening 19a through the communicating opening 19c to the outlet opening 19b.

In this case, there is a great fear that when the particle size of the particles of the slurry is small, the particles will be held at the entire contact area between the effective inner diameter $D_i$ of the seat 25 and the effective outer diameter $D_o$ of the valve body 26 to cause the packing condition. In this state, the following pressure $\Delta P_1$ is required for opening the valve in addition to the pressure $P_0$. It should be noted that although a pressure caused by a gravitational force applied to the valve body when the valve is opened should be considered, this pressure is very small and hence, negligible.

$$\frac{\pi}{4} D_o^2 P_0 < \frac{\pi}{4} D_i^2 (P_0 + \Delta P_1) \tag{1}$$

$$\text{Therefore, } \Delta P_1 > \left\{ \left(\frac{D_o}{D_i}\right) - 1 \right\} P_0 \tag{2}$$

where $D_o$ is the effective outer diameter of the valve body 26, $P_0$ is the pressure in the inlet opening 19a and outlet opening 19b at the normal closing condition, $D_i$ is the effective inner diameter of the valve seat 25, and $\Delta P_1$ is the pressure to be added to the pressure $P_0$ under the packing condition in which the overall contact area between the valve body 26 and the valve seat 25 assuming that the pressure on the outlet opening 19b side be represented by the pressure $P_0$.

To keep the pressure $\Delta P_1$ low, it is sufficient to make small the contact area between the valve body 26 and the valve seat 25. However, if the contact area is excessively narrow, the surface pressure therebetween becomes high resulting in a reduction of a service life of the valve. Therefore, it is necessary to select a suitable contact area in view of the service life of the check valve.

In the embodiment of the invention, in order that even if the check valve is under the packing condition, the check valve is opened with ease, the characteristic of the driving liquid pump is selected such that the differential pressure $\Delta P_2$ is higher than the pressure $\Delta P_1$; that is, a relationship of $(\Delta P_2 > \Delta P_1)$ is established. In other words, according to the invention, the differential pressure $\Delta P_2$ between the pressure at the regulated or normal flow rate and the pressure in the closing condition of the driving liquid pump is normally kept higher than the pressure $\Delta P_1$ which is necessary for opening the check valve under the packing condition.

Figure 5:
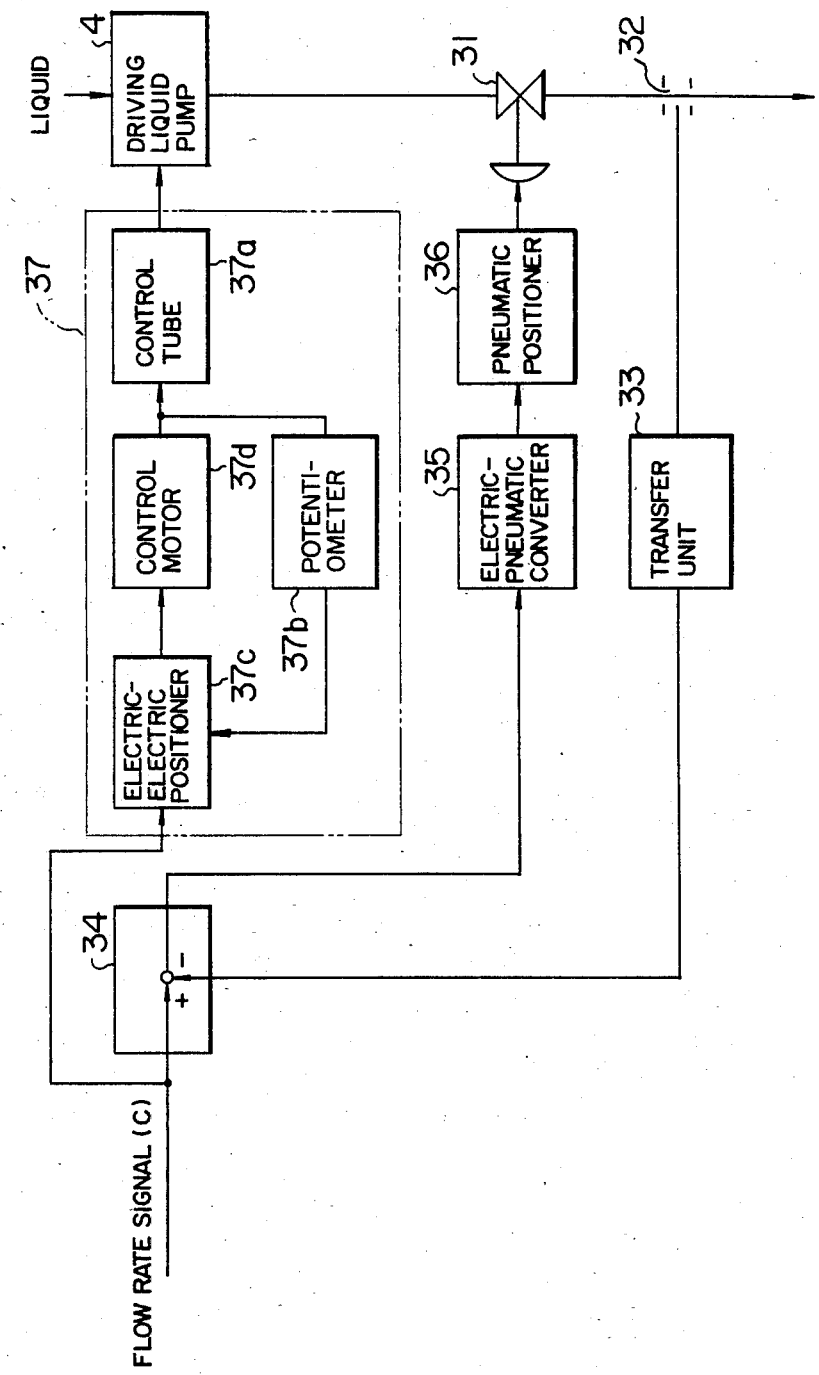
FIG. 5 is a block diagram showing a control circuit for the driving liquid pump used in the embodiment shown in FIG. 3.

FIG. 5 shows a control circuit for use in a case in which the driving liquid pump is operated at a constant rotational speed or a variable rotational speed.

In the constant rotational speed operation, a flow rate control valve 31 and a flow rate sensor 32 are disposed in the outlet flow passage or pipe of the driving liquid pump 4. An actual flow rate is detected by the sensor 32. A detecting signal of the sensor 32 is fed through a transfer unit 33 to a flow rate regulator 34. In the regulator 34, the set flow rate and the actual flow rate are compared with each other thereby outputting a signal corresponding to a deviation of flow rate therebetween. The control circuit is constructed so that the deviation signal is fed through an electric-pneumatic converter 35 and a pneumatic positioner 36 to the flow rate control valve 31. The adjustment of the flow rate is carried out by the flow rate control valve 31 on the basis of the signal of the regulator 34.

It is to be noted that in the constant rotation speed operation, it is necessary to select a driving liquid pump 4 having a performance characteristic of $\Delta P_2 > \Delta P_1$.

In FIG. 5, there is shown a control unit for use in the variable rotational speed operation, which is provided with a rotational speed control mechanism 37 in consideration of the pressure $\Delta P_2$ which is required for opening the check valve.

The rotational speed control mechanism 37 comprises a control tube 37a of the fluid coupling, a potentiometer 37b, an electric-electric positioner 37c and a control motor 37d. The electric-electric positioner 37c incorporates therein a multiplying factor compensating circuit (not shown) corresponding to the pressure $\Delta P_2$ with respect to the flow rate signal C. Thus, the rotational speed control is always attained in view of the pressure $\Delta P_2$ so that such an accident that the check valve 8 is not opened may be prevented.

With such a construction, the necessary flow rate of the slurry is fed to the rotational speed control mechanism 37 where the position of the control tube 37a of the fluid joint is adjusted by the control motor 37d whereby the rotational speed of the driving liquid pump 4 is regulated.

Figure 6:
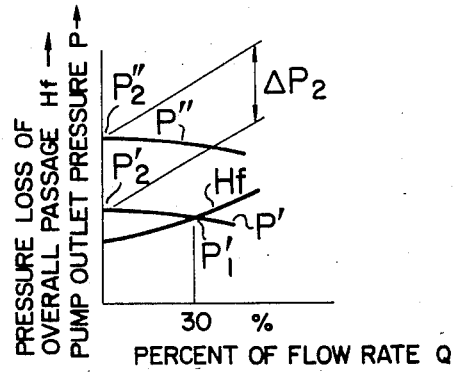
FIGS. 6 and 7 are graphs showing characteristic curves of the driving liquid pump used in the embodiment shown in FIG. 3.

Thus, even in the case where the flow rate is adjusted to about 30% by controlling the rotational speed of the driving liquid pump 4, as shown in FIG. 6, it is possible to keep the differential pressure $\Delta P_2$ which is to be obtained at the flow rate 100%.

More specifically, for instance, in the case where the flow rate signal C represents 30% of the normal flow rate, although the rotational speed should be controlled as indicated by the pump characteristic curve P' inherently, it is controlled as indicated by the characteristic curve P'' by the action of the multiplying factor compensating circuit built in the electric-electric positioner 37c. With this technique, the rotational speed control operates so that the rotational speed is always kept under a condition ready for providing a pressure exceeding the differential pressure $\Delta P_2$ of the pump, and unless the contact area between the valve body of the check valve 8 and the valve seat thereof is under the packing or sticking condition, in the same manner as in the constant rotational speed, the flow rate control valve 31 serves to throttle the flow passage in accordance with the flow rate signal C by the differential pressure $\Delta P_2$. Generally, the multiplying factor compensating circuit of the electric-electric positioner 37c serves to output a constant signal always with respect to the flow rate signal C. In this case, the rotational speed control must be carried out on the basis of the smallest flow rate of 30% of the flow rate adjustable range, for example. Although the fluid joint is utilized to save energy, the resultant effect is not desirable at the adjustment above 40%.

Therefore, according to the present invention, the following features are contributable to energy saving results.

Figure 7:
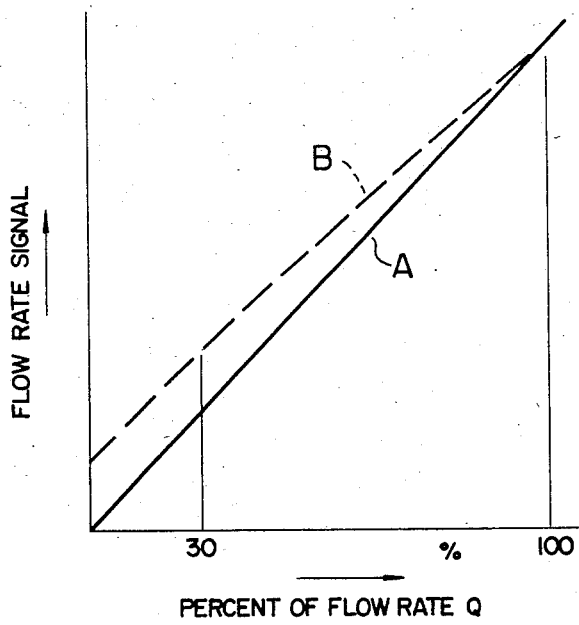

FIG. 7 shows a relationship between the flow rate Q and the flow rate signal, in which the solid line A and dotted line B show a reference flow rate signal in which the pressure $\Delta P_2$ which is required for opening the check valve is disregarded and a flow rate signal in which the differential pressure $\Delta P_2$ is regarded as a factor of the control, respectively. The dotted line B is determined by changing the ratio with respect to the reference flow rate signal A in accordance with the flow rate so as to follow an actual desired curve for the purpose of saving energy more effectively. It is understood for those skilled in the art that the specific operation thereof may readily be achieved by providing means for automatically changing the multiplying factor of the pump rotation speed in accordance with the flow rate signal C, in the electric-electric positioner 37c of the rotational speed control mechanism shown in FIG. 5.

As has been apparent from the foregoing description, according to the slurry continuous pressure feeding apparatus of the present invention, even if the valve connected to the lower portion of the supply chamber is under the packing condition upon slurry pressure feeding, the opening operation of the check valve may be achieved with ease whereby the continuous and stable slurry pressure feeding is possible.

What is claimed is:

1. A continuous pressure slurry feeding apparatus comprising a plurality of supply chambers respectively accommodating a float, a driving liquid pump and a slurry pump, said supply chambers being arranged in parallel to each other and being respectively connected to driving liquid supply and discharge pipes by means of change-over valves for pressure feeding of driving fluid in and out of the upper portion of each of the chambers, slurry supply and discharge pipes respectively connected to the lower portion of each of the chambers by means of lift type change-over valves for pressure feeding of slurry in and out of the lower portion of each of the chambers, sensor means for detecting a position of the float floating on an interface between slurry and driving liquid within each of said supply chambers, means for opening/closing said valves provided for the upper and lower portions of each of said supply chambers in accordance with a detecting signal of said sensor means whereby the slurry may be transferred under pressure through the lower portions of the supply chambers, and wherein means are provided for maintaining a differential pressure between a pressure at a normal flow rate and a pressure in a shut-off condition of the valve of the driving liquid pump which is higher than a pressure required for opening the lift type change-over valves positioned on the lower side of the chambers, wherein said means for maintaining includes a rotational speed control of said driving liquid pump which is carried out by a rotational speed control mechanism for keeping the rotational speed of the driving liquid pump under a condition in which an output pressure is provided exceeding the differential pressure of said driving liquid pump, and wherein said rotational speed control mechanism comprises a fluid joint having a control tube, a potentiometer, and electric-electric positioner and a control motor, whereby the rotational speed of said driving liquid pump corresponding to a flow rate which is required for feeding the slurry under pressure is controlled by adjusting the position of said control tube of said fluid joint.

* * * * *